United States Patent

Yamada

Patent Number: 6,072,913
Date of Patent: Jun. 6, 2000

[54] IMAGE PROCESSING METHOD AND APPARATUS

[75] Inventor: Masahiko Yamada, Kanagawa-ken, Japan

[73] Assignee: Fuji Photo Film Co., Ltd., Kanagawa-ken, Japan

[21] Appl. No.: 08/974,689

[22] Filed: Nov. 19, 1997

[30] Foreign Application Priority Data

Dec. 13, 1996 [JP] Japan .................................. 8-333835

[51] Int. Cl.⁷ ....................................................... G06K 9/40
[52] U.S. Cl. ........................................... 382/275; 382/260
[58] Field of Search ............................ 382/275, 260–269

[56] References Cited

U.S. PATENT DOCUMENTS

| | | | |
|---|---|---|---|
| 4,315,318 | 2/1982 | Kato et al. | 364/515 |
| 4,317,179 | 2/1982 | Kato et al. | 364/515 |
| 5,111,511 | 5/1992 | Ishii et al. | 382/1 |
| 5,173,788 | 12/1992 | Ohta | 358/454 |
| 5,454,044 | 9/1995 | Nakajima | 382/132 |
| 5,739,922 | 4/1998 | Matama | 358/447 |
| 5,774,597 | 6/1998 | Wilson | 382/250 |
| 5,774,599 | 6/1998 | Muka et al. | 382/254 |
| 5,825,841 | 10/1998 | Timmer | 378/4 |

FOREIGN PATENT DOCUMENTS 6-292009  10/1994  Japan .................................. H04N 1/40

Primary Examiner—Thomas D. Lee
Assistant Examiner—Stephen Brinich
Attorney, Agent, or Firm—Sughrue, Mion, Zinn, Macpeak & Seas, PLLC

[57] ABSTRACT

Unsharp mask image signals having different frequency response characteristics are formed from an original image signal, and band-limited image signals are formed from the unsharp mask image signals. First and second converting processes are carried out on the band-limited image signals, and first converted image signals and second converted image signals are thereby formed. The first converted image signals are integrated, and a signal concerning high frequency components is thereby obtained. Also, the second converted image signals are integrated, the thus obtained integration signal is subtracted from the original image signal, and a difference signal is thereby formed. The difference signal is converted, and a signal concerning low frequency components is thereby obtained. The signal concerning high frequency components and the signal concerning low frequency components are added to the original image signal. Thus the high frequency components of the original image signal are emphasized, and the dynamic range of the original image signal is compressed.

4 Claims, 10 Drawing Sheets

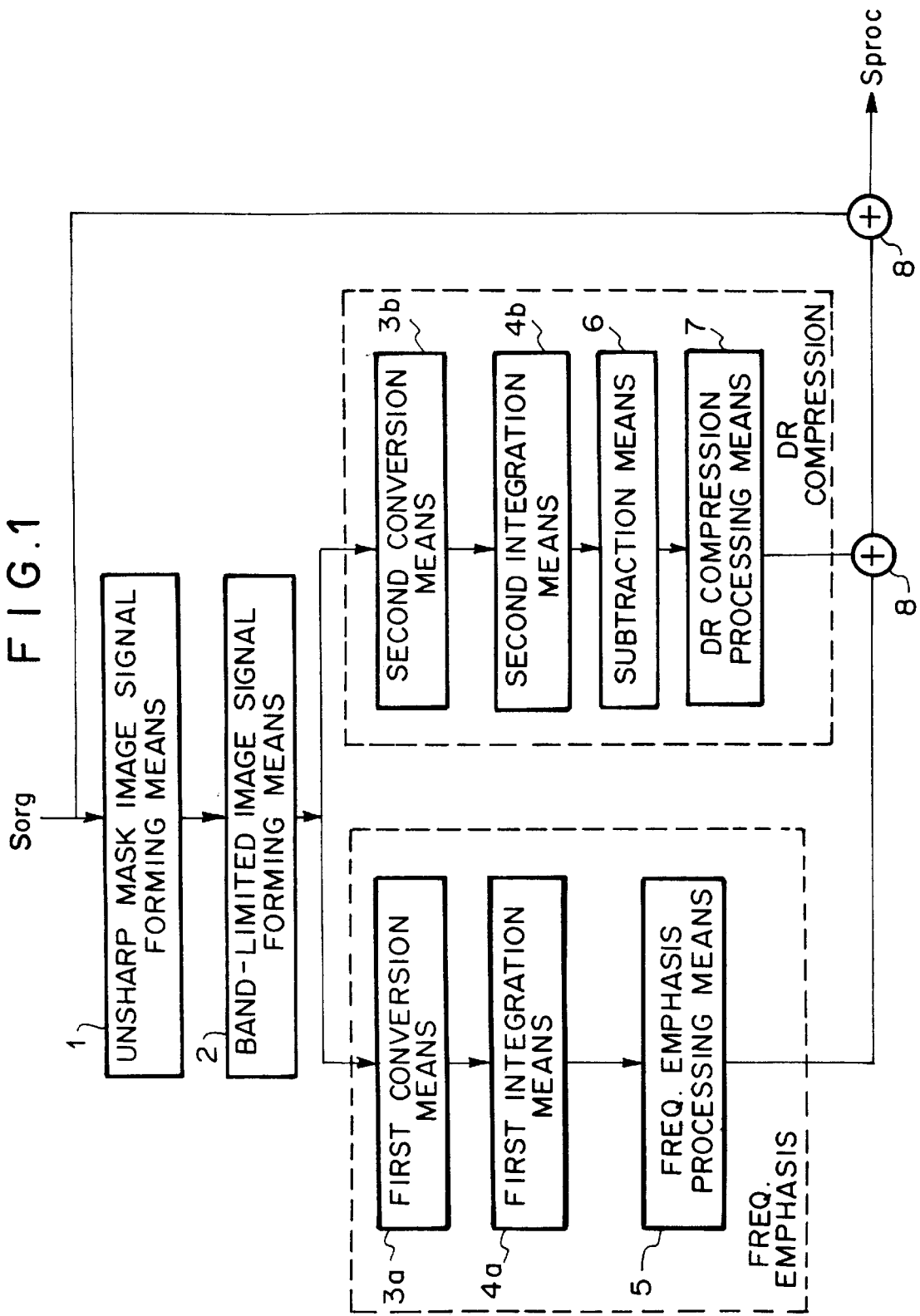

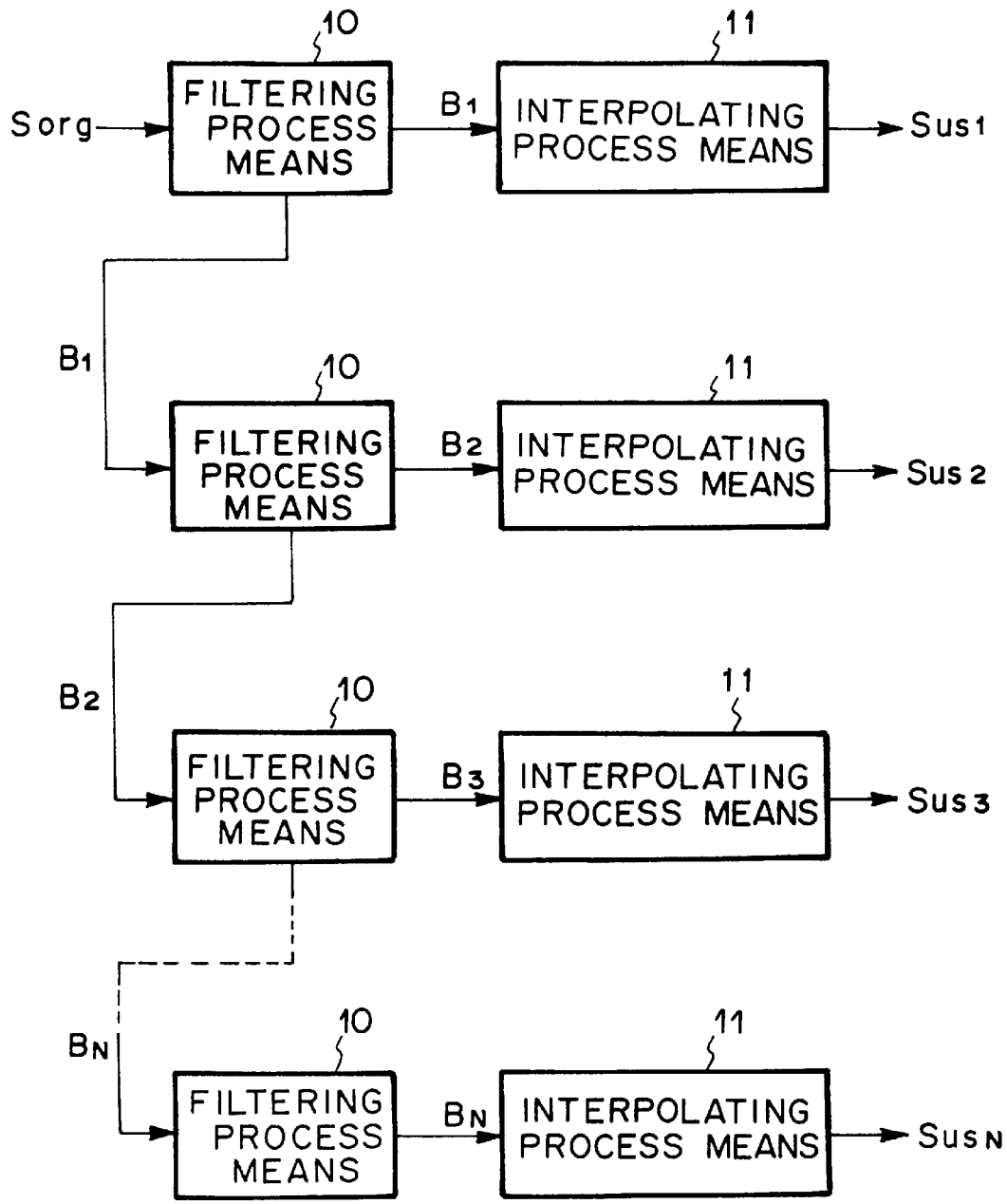

| 0.0025 | 0.0125 | 0.02 | 0.0125 | 0.0025 |
|--------|--------|------|--------|--------|
| 0.0125 | 0.0625 | 0.1  | 0.0625 | 0.0125 |
| 0.02   | 0.1    | 0.16 | 0.1    | 0.02   |
| 0.0125 | 0.0625 | 0.1  | 0.0625 | 0.0125 |
| 0.0025 | 0.0125 | 0.02 | 0.0125 | 0.0025 |

| 0.1 | 0.5 | 0.8 | 0.5 | 0.1 |
|-----|-----|-----|-----|-----|

F I G. 9
| 0.05 | 0.13 | 0.3 | 0.5 | 0.65 | 0.74 | 0.65 | 0.5 | 0.3 | 0.13 | 0.05 |
F I G. 10
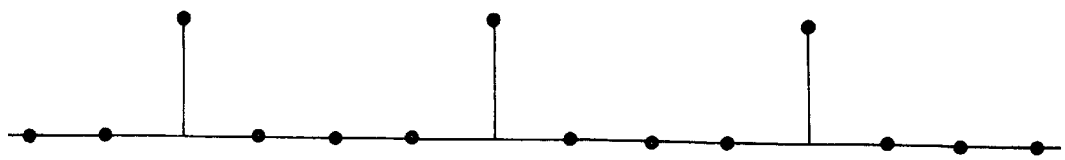
F I G. 11
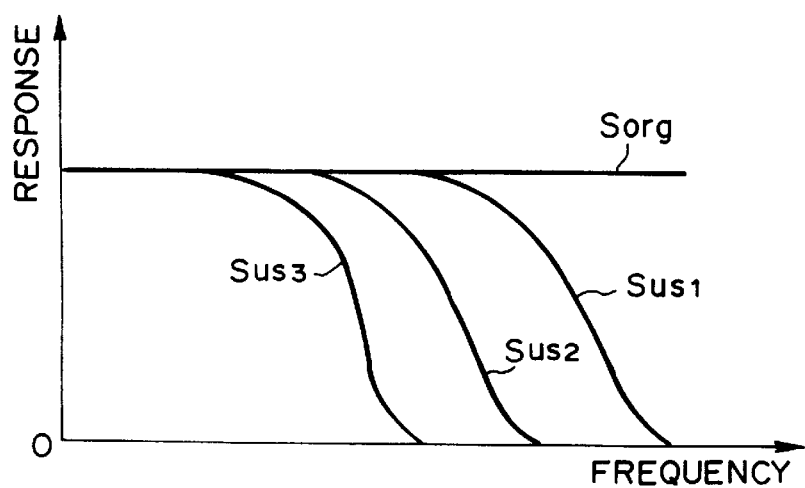

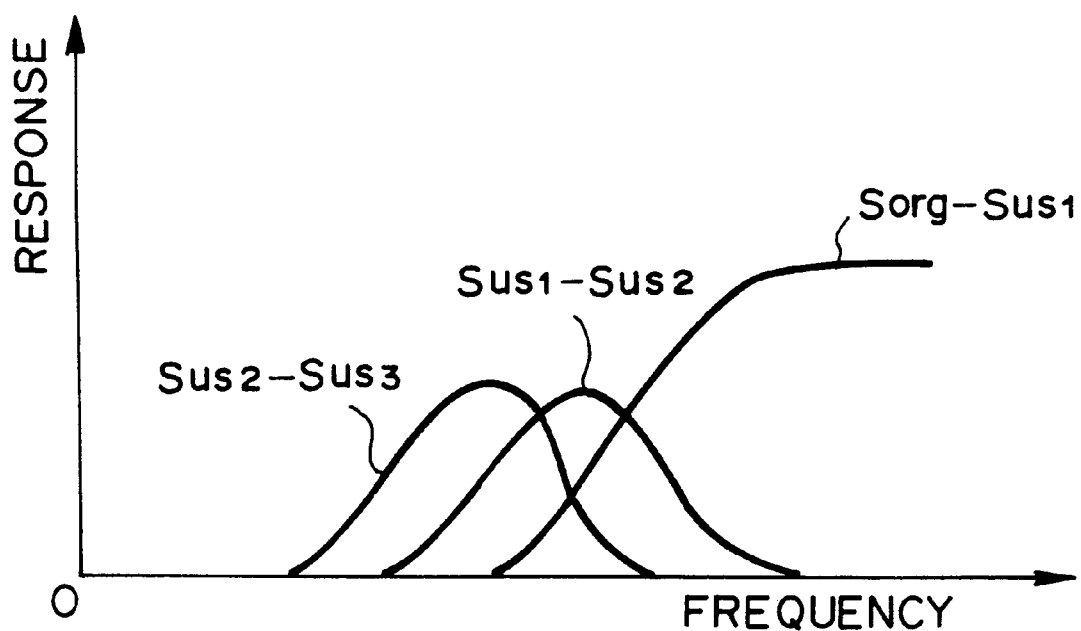
F I G .13

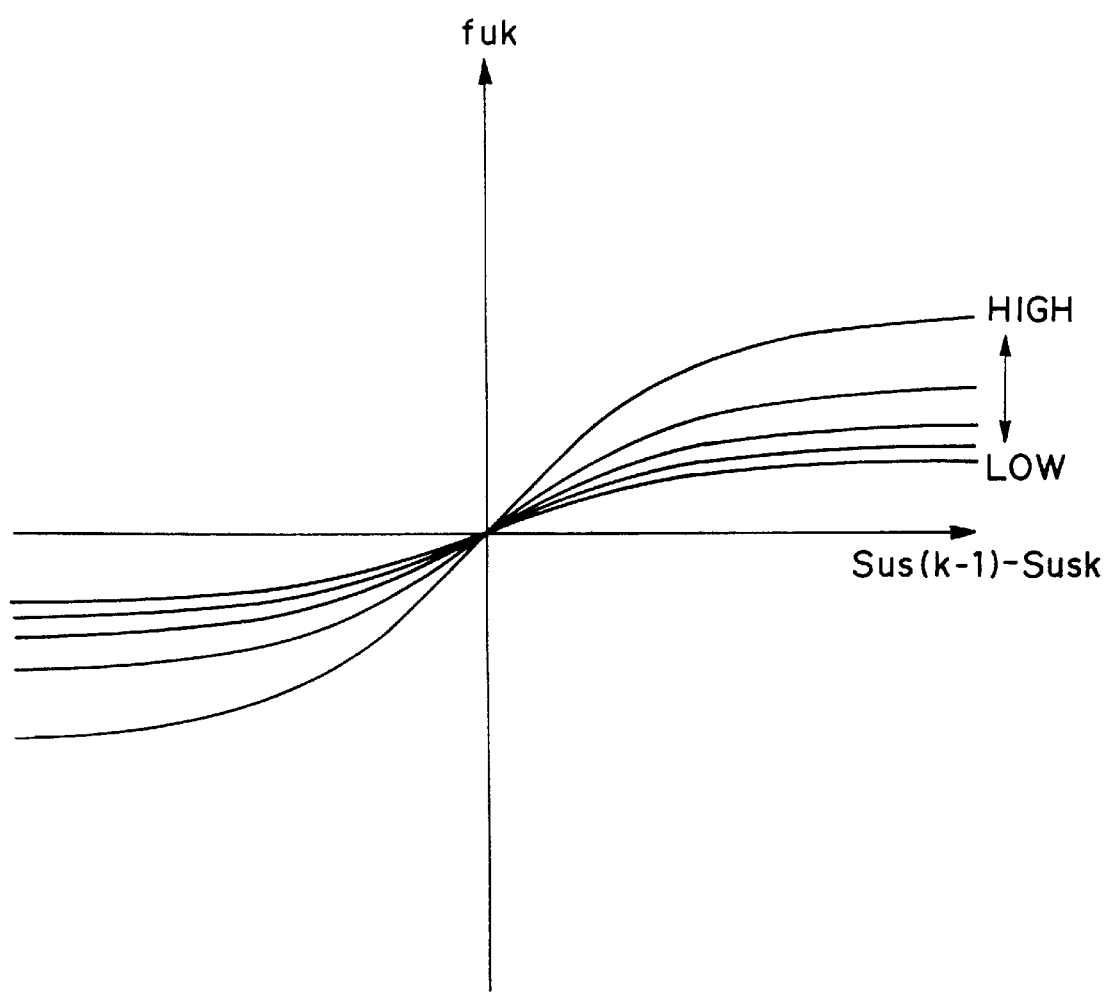
F I G. 15

IMAGE PROCESSING METHOD AND APPARATUS

BACKGROUND OF THE INVENTION

1. Field of the Invention

This invention relates to an image processing method and apparatus, wherein frequency emphasis processing, which utilizes an unsharp mask image signal formed from an original image signal, and dynamic range compression processing, which utilizes the unsharp mask image signal, are simultaneously carried out on the original image signal.

2. Description of the Prior Art

The applicant has proposed various image processing methods and apparatuses, wherein frequency emphasis processing or dynamic range compression processing is carried out on an image signal, which represents a radiation image, by using an unsharp mask image signal, and a visible radiation image, which has good image quality and can serve as an effective tool in, particularly, the efficient and accurate diagnosis of an illness, is thereby obtained. (Such techniques are described in, for example, U.S. Pat. Nos. 4,315,318; 4,317,179 and 5,454,044.)

Also, an image processing method and apparatus, wherein both of frequency emphasis processing and dynamic range compression processing are carried out on a single image signal, are disclosed in, for example, Japanese Unexamined Patent Publication No. 6(1994)-292009. In the disclosed image processing method and apparatus, the frequency emphasis processing is carried out in order to compensate for contrast resolution which becomes low due to dynamic range compression, and in order to compensate for a feeling that contrast has become low due to the dynamic range compression. Specifically, in the disclosed image processing method and apparatus, the processing is carried out with Formula (1) shown below.

$$S_{proc} = S_{org} + f_1(Sus1) + f_2(Sorg - Sus2) \quad (1)$$

wherein Sproc represents the processed image signal, Sorg represents the original image signal, each of Sus1 and Sus2 represents the unsharp mask image signal, $f_1$ represents the monotonously decreasing function, and $f_2$ represents the monotonously increasing function.

However, with the image processing method disclosed in Japanese Unexamined Patent Publication No. 6(1994)-292009, the problems occur in that, in the region in the vicinity of an edge in the image, at which the image signal value changes sharply, the unsharp mask image signal is affected by the image signal value of the edge in the image. Therefore, an artifact, such as overshoot, undershoot, or an artificial contour, occurs in the image, which is obtained from the processing with the unsharp mask image signal.

SUMMARY OF THE INVENTION

The primary object of the present invention is to provide an image processing method, wherein both of frequency emphasis processing and dynamic range compression processing are carried out on an original image signal such that deterioration of image quality due to an artifact may not occur.

Another object of the present invention is to provide an apparatus for carrying out the image processing method.

The present invention provides an image processing method, wherein a signal concerning high frequency components of an original image signal, which represents an original image, is added to the original image signal, the high frequency components of the original image signal being thereby emphasized, and wherein a signal concerning low frequency components of the original image signal is added to the original image signal, the dynamic range of the original image signal being thereby compressed, the method comprising the steps of:

i) forming a plurality of unsharp mask image signals, which have different frequency response characteristics, from the original image signal, ii) forming a plurality of band-limited image signals, each of which represents one of signals falling within a plurality of different frequency bands of the original image signal, from the original image signal and the plurality of the unsharp mask image signals, or from the plurality of the unsharp mask image signals, iii) obtaining the signal concerning the high frequency components of the original image signal by:

carrying out a first converting process on at least one band-limited image signal, which is among the plurality of the band-limited image signals, such that at least a portion of the band-limited image signal may become small, a plurality of first converted image signals being thereby formed, and integrating the plurality of the first converted image signals, iv) obtaining the signal concerning the low frequency components of the original image signal by:

carrying out a second converting process on at least one band-limited image signal, which is among the plurality of the band-limited image signals, such that at least a portion of the band-limited image signal may become small, a plurality of second converted image signals being thereby formed, integrating the plurality of the second converted image signals, an integration signal being thereby formed, subtracting the integration signal from the original image signal, a difference signal being thereby formed, and converting the difference signal, and v) adding the signal concerning the high frequency components and the signal concerning the low frequency components to the original image signal, whereby the high frequency components of the original image signal are emphasized and the dynamic range of the original image signal is compressed.

The present invention also provides an image processing apparatus, wherein a signal concerning high frequency components of an original image signal, which represents an original image, is added to the original image signal, the high frequency components of the original image signal being thereby emphasized, and wherein a signal concerning low frequency components of the original image signal is added to the original image signal, the dynamic range of the original image signal being thereby compressed, the apparatus comprising:

i) an unsharp mask image signal forming means for forming a plurality of unsharp mask image signals, which have different frequency response characteristics, from the original image signal, ii) a band-limited image signal forming means for forming a plurality of band-limited image signals, each of which represents one of signals falling within a plurality of different frequency bands of the original image signal, from the original image signal and the plurality of the unsharp mask image signals, or from the plurality of the unsharp mask image signals, iii) a first conversion means for carrying out a first converting process on at least one band-limited image signal, which is among the plurality of the band-limited image signals, such that at least a portion of the band-limited image signal may become small, and thereby forming a plurality of first converted image signals, iv) a first integration means for integrating the plurality of the first converted image signals, which have been formed by the first conversion means, and thereby forming a first integration signal, v) a frequency emphasis processing means for obtaining the signal concerning the high frequency components of the original image signal in accordance with the first integration signal, vi) a second conversion means for carrying out a second converting process on at least one band-limited image signal, which is among the plurality of the band-limited image signals, such that at least a portion of the band-limited image signal may become small, and thereby forming a plurality of second converted image signals, vii) a second integration means for integrating the plurality of the second converted image signals, which have been formed by the second conversion means, and thereby forming a second integration signal, viii) a subtraction means for subtracting the second integration signal from the original image signal, and thereby forming a difference signal, ix) a dynamic range compression processing means for converting the difference signal and thereby obtaining the signal concerning the low frequency components of the original image signal, and x) an addition means for adding the signal concerning the high frequency components and the signal concerning the low frequency components to the original image signal, whereby the high frequency components of the original image signal are emphasized and the dynamic range of the original image signal is compressed.

The unsharp mask image signal represents an image, which is constituted of the same number of picture elements as that of the picture elements of the original image represented by an original image signal, and has sharpness lower than the sharpness of the original image. The unsharp mask image signal is formed by carrying out a predetermined filtering process with respect to each of the picture elements of the original image represented by the original image signal, which are selected at predetermined intervals, thereby thinning out the picture elements, and thereafter interpolating the same number of picture elements as that of the picture elements, which were removed by the filtering process, in accordance with a predetermined interpolating operation.

In the image processing method and apparatus in accordance with the present invention, the formation of the band-limited image signals, the formation of the first converted image signals, the formation of the second converted image signals, the formation of the signal concerning the high frequency components, the formation of the signal concerning the low frequency components, and the addition of the signal concerning the high frequency components and the signal concerning the low frequency components to the original image signal should preferably be carried out with the formula:

$$S_{proc} = S_{org} + \beta(S_{org}) \cdot F_{usm}(S_{org}, S_{us1}, S_{us2}, \ldots, S_{usN}) + D(S_{org} - F_{drc}(S_{org}, S_{us1}, S_{us2}, \ldots, S_{usN}))$$

$$F_{usm}(S_{org}, S_{us1}, S_{us2}, \ldots, S_{usN}) = \{f_{u1}S_{org} - S_{US1}) + f_{u2}(S_{us1} - S_{us2}) + \ldots + f_{uk}(S_{usk-1} - S_{usk}) + \ldots + f_{uN}(S_{usN-1} - S_{usN})\}$$

$$F_{drc}(S_{org}, S_{us1}, S_{us2}, \ldots, S_{usN}) = \{f_{d1}(S_{org} - S_{us1}) + f_{d2}(S_{us1} - S_{us2}) + \ldots + f_{dk}(S_{usk-1} - S_{usk}) + \ldots + f_{dN}(S_{usN-1} - S_{usN})\}$$

wherein $S_{proc}$ represents the processed image signal, $S_{org}$ represents the original image signal, $S_{usk}$ (k=1 to N) represents the unsharp mask image signal, $f_{uk}$ (k=1 to N) represents the function used in the first converting process, $f_{dk}$ (k=1 to N) represents the function used in the second converting process, $\beta(S_{org})$ represents the emphasis coefficient determined in accordance with the original image signal, and $D(S_{org} - F_{drc})$ represents the dynamic range compression factor determined in accordance with the low frequency component signal, in which D represents the function for converting $S_{org} - F_{drc}$.

With the image processing method and apparatus in accordance with the present invention, the unsharp mask image signals of the original image signal are formed, and both of the frequency emphasis processing and the dynamic range compression processing are carried out on the original image signal by using the unsharp mask image signals. In such cases, the plurality of the unsharp mask image signals, which have different frequency response characteristics, are formed from the original image signal, the differences between the unsharp mask image signals are calculated, and the signals falling within different frequency bands of the original image signal are thereby formed. The signals of predetermined frequency components, which signals are to be used for the frequency emphasis processing and the dynamic range compression processing, are obtained by converting the signals falling within different frequency bands of the original image signal, thereby obtaining the converted image signals, and thereafter integrating the converted image signals. Therefore, signals of frequency components, which cause an artifact to occur, can be restricted efficiently, and a processed image signal representing an image with good image quality can be obtained.

BRIEF DESCRIPTION OF THE DRAWINGS

FIG. 1 is a block diagram showing the concept behind the image processing apparatus in accordance with the present invention, FIG. 2 is a block diagram showing an unsharp mask image signal forming means, FIG. 3 is an explanatory view showing a (one-dimensional) filter, which is used in the unsharp mask image signal forming means, FIG. 9 is an explanatory view showing a filter, which is used in an interpolating operation carried out on a filtering-processed image signal $B_2$, FIG. 10 is an explanatory view showing how an interpolating operation is carried out, FIG. 11 is a graph showing frequency characteristics of unsharp mask image signals, FIG. 13 is a graph showing examples of frequency characteristics of band-limited image signals, FIG. 15 is a graph showing different examples of functions, which are used in a converting process carried out on band-limited image signals in the first conversion means.

DESCRIPTION OF THE PREFERRED EMBODIMENTS

Figure 4:
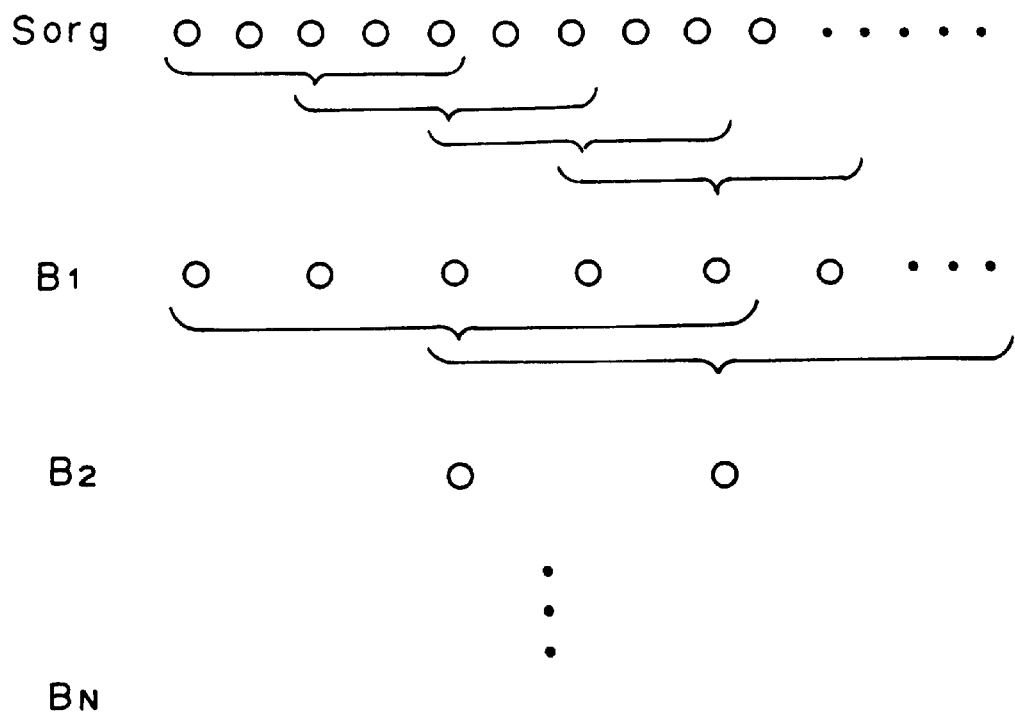
FIG. 4 is an explanatory view showing how a filtering process is carried out.

The present invention will hereinbelow be described in further detail with reference to the accompanying drawings.

In the embodiment described below, unsharp mask image signals are formed from an original image signal having been obtained by reading out a radiation image of a human body from a stimulable phosphor sheet, on which the radiation image has been recorded. Image processing is then carried out by using the unsharp mask image signals such that an image may be obtained, which has good image quality and can serve as an effective tool in the efficient and accurate diagnosis of an illness. A visible image is then reproduced on photographic film, or the like, from the processed image signal, which has been obtained from the processing, and utilized in making a diagnosis.

FIG. 1 is a block diagram showing the concept behind the image processing apparatus in accordance with the present invention. As illustrated in FIG. 1, the image processing apparatus in accordance with the present invention comprises an unsharp mask image signal forming means 1 for forming multi-resolution unsharp mask image signals Susk (where k=1 to n), which have different frequency response characteristics, from a received original image signal Sorg. The image processing apparatus also comprises a band-limited image signal forming means 2 for forming a plurality of band-limited image signals from the unsharp mask image signals Susk, which have been formed by the unsharp mask image signal forming means 1. The image processing apparatus further comprises a first conversion means 3a for carrying out a first converting process on at least one band-limited image signal, which is among the plurality of the band-limited image signals having been formed by the band-limited image signal forming means 2, such that at least a portion of the band-limited image signal may become small, and thereby forming a plurality of first converted image signals. The image processing apparatus still further comprises a first integration means 4a for integrating the plurality of the first converted image signals, which have been formed by the first conversion means 3a, and thereby forming a first integration signal, and a frequency emphasis processing means 5 for multiplying the first integration signal, which has been obtained from the first integration means 4a, by a predetermined emphasis coefficient.

The image processing apparatus also comprises a second conversion means 3b for carrying out a second converting process on at least one band-limited image signal, which is among the plurality of the band-limited image signals having been formed by the band-limited image signal forming means 2, such that at least a portion of the band-limited image signal may become small, and thereby forming a plurality of second converted image signals. The image processing apparatus further comprises a second integration means 4b for integrating the plurality of the second converted image signals, which have been formed by the second conversion means 3b, and thereby forming a second integration signal, and a subtraction means 6 for subtracting the second integration signal, which has been formed by the second integration means 4b, from the original image signal Sorg, and thereby forming a difference signal. The image processing apparatus still further comprises a dynamic range compression processing means 7 for converting the difference signal, which has been obtained from the subtraction means 6. The image processing apparatus also comprises an addition means 8 for adding the signals, which have been formed by the frequency emphasis processing means 5 and the dynamic range compression processing means 7, to the original image signal Sorg.

Firstly, how the processing is carried out by the unsharp mask image signal forming means 1 will be described hereinbelow. FIG. 2 is a block diagram showing how the processing is carried out by the unsharp mask image signal forming means 1. As illustrated in FIG. 2, the digital original image signal Sorg representing the original image is subjected to a filtering process, which is carried out with a low pass filter in a filtering process means 10. As the low pass filter, by way of example, a 5×1 grid-like filter F shown in FIG. 3 may be used. The filter F approximately corresponds to a one-dimensional Gaussian distribution. The filter F may be represented by Formula (2)

$$f(t) = e^{-\frac{t^2}{2\sigma^2}} \quad (2)$$

wherein σ=1. The Gaussian signal has good locality characteristics both in the frequency space and in the spatial domain and is therefore utilized as the filter F.

The filtering process is carried out with the filter F along x and y directions in the array of picture elements of the original image. In this manner, the filtering process is carried out with respect to the entire original image signal Sorg.

Figure 5:
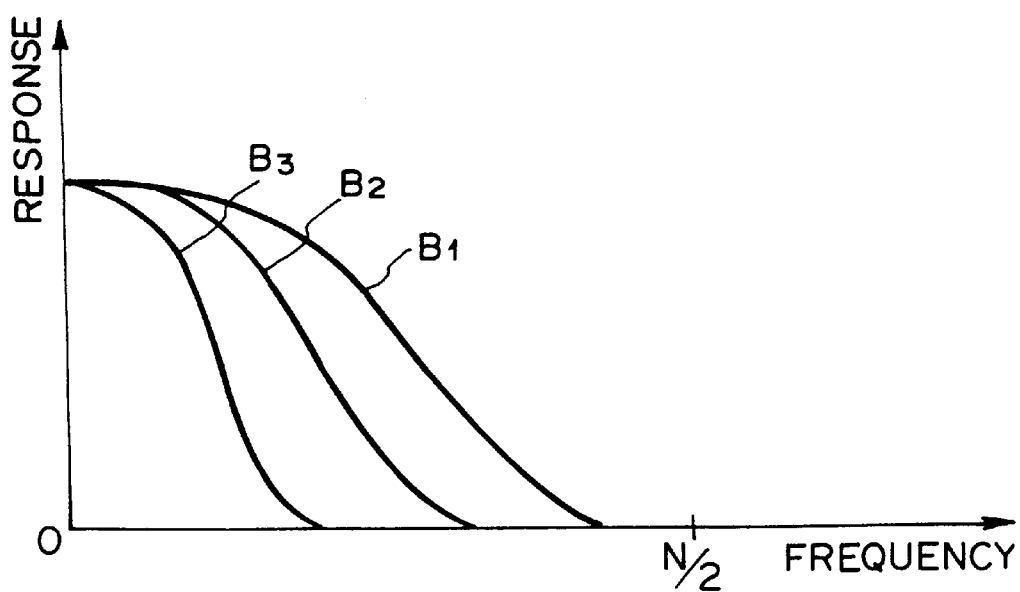
FIG. 5 is a graph showing frequency characteristics of filtering-processed image signals.

In the filtering process means 10, the filtering process with the filter F is carried out in the manner described below. FIG. 4 is an explanatory view showing how the filtering process is carried out. As illustrated in FIG. 4, the filtering process is carried out by using the filter F shown in FIG. 3 and with respect to the image signal components of the original image signal Sorg, which represent the picture elements located at every second row and every second column in the array of picture elements of the original image. From the filtering process, a filtering-processed image signal $B_1$ is obtained. The filtering-processed image signal $B_1$ represents a filtering-processed image, which has a size ¼ times (½ times in each of the x direction and the y direction) as large as the size of the original image. Thereafter, the filtering process is carried out on the filtering-processed image signal $B_1$ by using the filter F. The filtering process is carried out with respect to the image signal components of the filtering-processed image signal $B_1$, which represent the picture elements located at every second row and every second column in the array of picture elements of the filtering-processed image. The filtering process with the filter F is thus carried out successively, and n number of filtering-processed image signals $B_k$, where k=1 to n, are thereby obtained. Each of the filtering-processed image signals $B_k$ represents the filtering-processed image, which has a size $\frac{1}{2}^{2k}$ times as large as the size of the original image. Also, the filtering-processed image signals $B_k$ have the frequency characteristics shown in FIG. 5. As illustrated in FIG. 5, the filtering-processed image signals $B_k$ have the response characteristics such that the high frequency components may have been eliminated successively as the value of k becomes large. In FIG. 5, the response characteristics of only the three filtering-processed image signals $B_k$, where k=1, 2, and 3, are shown.

Figures 6, 7, 8:
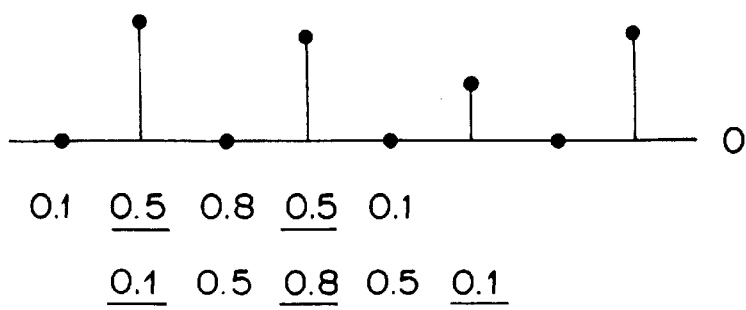
FIG. 6 is an explanatory view showing a (two-dimensional) filter, which may be used in a filtering process means.
FIG. 7 is an explanatory view showing a filter, which is used in an interpolating operation carried out on a filtering-processed image signal $B_1$.
FIG. 8 is an explanatory view showing how an interpolating operation is carried out.

In the embodiment described above, the filtering process is carried out by using the one-dimensional filter F shown in FIG. 3 and along the x direction and the y direction of the original image. Alternatively, as illustrated in FIG. 6, the filtering process may be carried out on the original image signal Sorg and each of the filtering-processed image signals $B_k$ by using a 5×5 two-dimensional filter.

Thereafter, in an interpolating process means 11 shown in FIG. 2, an interpolating operation process is carried out on each of the filtering-processed image signals $B_k$. From the interpolating operation process, multi-resolution unsharp mask images having the same size as the size of the original image are obtained. How the interpolating operation process is carried out will be described hereinbelow.

As the interpolating operation technique, one of various techniques, such as a B spline technique, may be employed. In this embodiment, the filter F in accordance with the Gaussian signal is used as the low pass filter, and therefore a Gaussian signal is utilized as the interpolation coefficient for carrying out the interpolating operation. The interpolation coefficient utilizing the Gaussian signal is represented by Formula (3)

$$I(t) = 2 \cdot \sigma \cdot e^{-\frac{t^2}{2\sigma^2}} \tag{3}$$

wherein $\sigma = 2^{k-1}$.

In the interpolating operation for the filtering-processed image signal $B_1$, k=1 and therefore $\sigma=1$. In cases where $\sigma=1$ in Formula (3) shown above, the filter for carrying out the interpolating operation becomes identical with a 5×1 one-dimensional filter $F_1$ shown in FIG. 7. Firstly, a single picture element having a value of 0 is inserted between two adjacent picture elements in the filtering-processed image represented by the filtering-processed image signal $B_1$. In this manner, the size of the filtering-processed image represented by the filtering-processed image signal $B_1$ is enlarged to the same size as the size of the original image. FIG. 8 illustrates the filtering-processed image signal $B_1$, which has been obtained from the insertion of the picture elements having a value of 0, as a one-dimensional pattern. Thereafter, a filtering process is carried out on the filtering-processed image signal $B_1$, which has been obtained from the insertion of the picture elements having a value of 0, by using the filter $F_1$ shown in FIG. 7.

The filter $F_1$ shown in FIG. 7 is the 5×1 filter. As illustrated in FIG. 8, in the filtering-processed image represented by the filtering-processed image signal $B_1$ obtained from the inserting operation, a single picture element having a value of 0 has been inserted between two adjacent picture elements. Therefore, the filtering process, which is carried out on the filtering-processed image signal $B_1$ by using the filter $F_1$, becomes substantially equivalent to the filtering process, which is carried out with two kinds of filters, i.e. a 2×1 filter (0.5, 0.5) and a 3×1 filter (0.1, 0.8, 0.1). From the filtering process, an unsharp mask image signal Sus1 is obtained, which is constituted of the same number of image signal components as that in the original image signal Sorg, i.e. which represents an unsharp mask image having the same size as that of the original image.

Thereafter, a filtering process is carried out on a filtering-processed image signal $B_2$. In the interpolating operation for the filtering-processed image signal $B_2$, k=2 and therefore $\sigma=2$. In cases where $\sigma=2$ in Formula (3) shown above, the filter for carrying out the interpolating operation becomes identical with a 11×1 one-dimensional filter $F_2$ shown in FIG. 9. Firstly, as illustrated in FIG. 10, three picture elements having a value of 0 are inserted between two adjacent picture elements in the filtering-processed image represented by the filtering-processed image signal $B_2$. In this manner, the size of the filtering-processed image represented by the filtering-processed image signal $B_2$ is enlarged to the same size as the size of the original image. Thereafter, a filtering process is carried out on the filtering-processed image signal $B_2$, which has been obtained from the insertion of the picture elements having a value of 0, by using the filter $F_2$ shown in FIG. 9.

The filter $F_2$ shown in FIG. 9 is the 11×1 filter. As illustrated in FIG. 10, in the filtering-processed image represented by the filtering-processed image signal $B_2$ obtained from the inserting operation, three picture elements having a value of 0 have been inserted between two adjacent picture elements. Therefore, the filtering process, which is carried out on the filtering-processed image signal $B_2$ by using the filter $F_2$, becomes substantially equivalent to the filtering process, which is carried out with four kinds of filters, i.e. a 2×1 filter (0.5, 0.5) and 3×1 filters (0.3, 0.65, 0.05), (0.13, 0.74, 0.13), and (0.05, 0.65, 0.3). From the filtering process, an unsharp mask image signal Sus2 is obtained, which is constituted of the same number of image signal components as that in the original image signal Sorg.

The filtering process described above is carried out on all of the filtering-processed image signals $B_k$. In the interpolating operation for the filtering-processed image signals $B_k$, a filter having a length of $3 \times 2^k - 1$ is prepared in accordance with Formula (3). Also, $2^k - 1$ number of picture elements having a value of 0 are inserted between two adjacent picture elements of each filtering-processed image signal $B_k$, and the size of the filtering-processed image represented by the filtering-processed image signal $B_k$ is thereby enlarged to the same size as that of the original image. Thereafter, the filtering process is carried out on the filtering-processed image signal $B_k$, which has been obtained from the insertion of the picture elements having a value of 0, by using the filter having a length of $3 \times^k - 1$.

The filtering process carried out with the filter having a length of $3 \times 2^k - 1$ becomes equivalent to the filtering process, which is carried out by using a filter having a length of 2 or 3 with a period of $2^k$. From the filtering process, n number of unsharp mask image signals Susk are obtained. When visible images are reproduced from the unsharp mask image signals Susk, multi-resolution unsharp mask images are obtained, which have different levels of resolution, i.e. which have different frequency response characteristics. As described above, even though the length of the filter becomes long, the filtering process becomes substantially equivalent to the filtering process carried out with a filter having a length of 2 or 3. Therefore, even though the length of the filter becomes long, the amount of operations does not become very large. Accordingly, the amount of operations can be kept small, and the multi-resolution unsharp mask image signals Susk can be obtained quickly.

In this embodiment, the filtering process is carried out along the x direction and the y direction of the image by using the one-dimensional filter having a length of $3\times2^k-1$. Alternatively, a two-dimensional filter may be prepared previously, the filtering process of each of the filtering-processed images may be carried out by using the two-dimensional filter, and the unsharp mask image signals Susk may thereby be obtained. In such cases, as the filter used in the filtering process for carrying out the interpolating operation on the filtering-processed image, a $(3\times2^k-1)\times(3\times2^k-1)$ filter is used. As in cases where the one-dimensional filter described above is used, the filtering process with the two-dimensional filter becomes equivalent to the filtering process, which is carried out by using a 2×2 or 3×3 filter with a period of $2^k$. Therefore, as in cases where the one-dimensional filter described above is used, even though the size of the filter becomes large, the amount of operations for carrying out the filtering process does not become very large.

The unsharp mask image signals Susk having been obtained in the manner described above have the frequency characteristics shown in FIG. 11. As illustrated in FIG. 11, the unsharp mask image signals Susk have the frequency characteristics such that the high frequency components of the original image signal Sorg may have been eliminated successively as the value of k becomes large.

Figure 12:
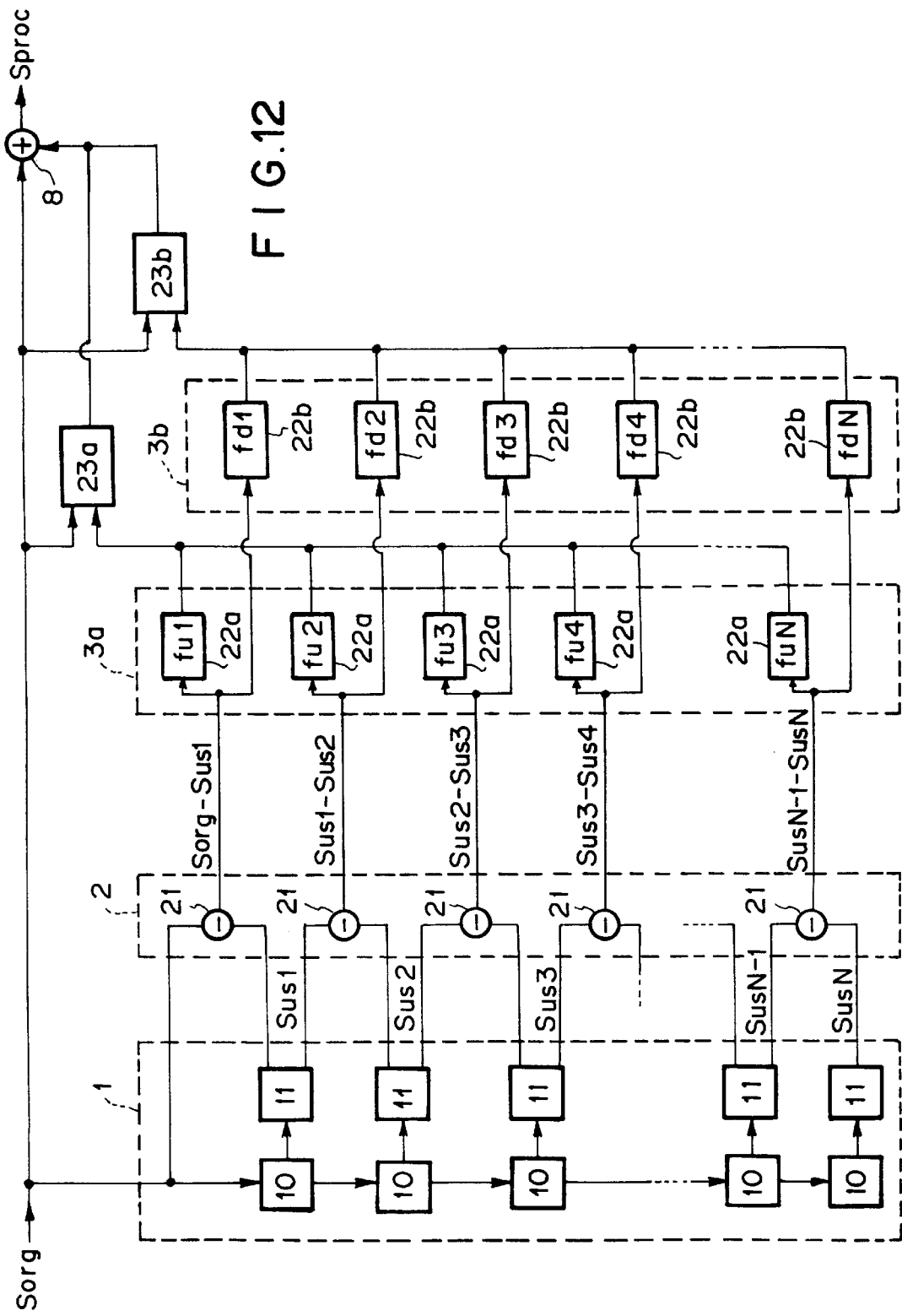
FIG. 12 is a block diagram showing an embodiment of the image processing apparatus in accordance with the present invention.

FIG. 12 is a block diagram showing an embodiment of the image processing apparatus in accordance with the present invention, in which the unsharp mask image signal forming means 1 shown in FIG. 2 is employed. As illustrated in FIG. 12, the plurality of the unsharp mask image signals Susk, which have been formed by the unsharp mask image signal forming means 1, are then processed in the band-limited image signal forming means 2, the first conversion means 3a, and the second conversion means 3b. Firstly, the band-limited image signals are formed from the original image signal Sorg and the plurality of the unsharp mask image signals Susk, which have been formed by the unsharp mask image signal forming means 1. Each of the band-limited image signals is obtained from a subtracter 21, which subtracts the unsharp mask image signals Susk of two adjacent frequency bands (as for the original image signal Sorg, Sorg and Sus1) from each other. Specifically, the values of Sorg−Sus1, Sus1−Sus2, . . . , SusN−1−SusN are calculated successively, and the plurality of the band-limited image signals are thereby obtained. FIG. 13 shows the frequency characteristics of the band-limited image signals. As illustrated in FIG. 13, the band-limited image signals have the frequency characteristics such that they may represent the bands of low frequency components of the original image signal Sorg as the value of k of the unsharp mask image signal Susk becomes large.

As illustrated in FIG. 12, the band-limited image signals having been obtained in the manner described above are fed into the first conversion means 3a and the second conversion means 3b. The band-limited image signals are processed by converters 22a, 22a, . . . of the first conversion means 3a and converters 22b, 22b, . . . of the second conversion means 3b.

Figure 14:
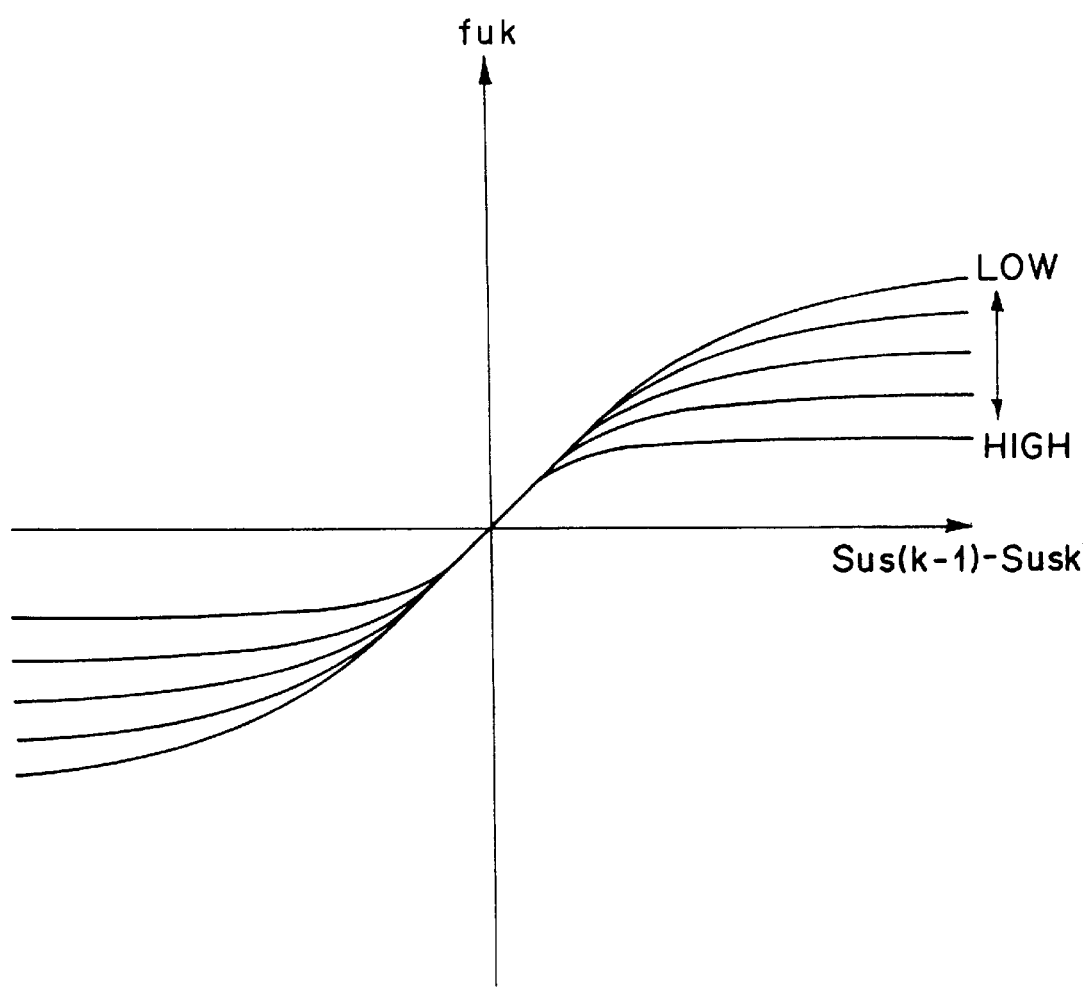
FIG. 14 is a graph showing examples of functions, which are used in a converting process carried out on band-limited image signals in a first conversion means.

The conversion with the converters 22a, 22a, of the first conversion means 3a is carried out by using, for example, functions shown in FIG. 14, functions shown in FIG. 15, or a combination of the functions shown in FIG. 14 and the functions shown in FIG. 15. Functions $f_{u1}$ to $f_{uN}$ for converting the band-limited image signals may be identical with one another. However, each of the functions $f_{u1}$ to $f_{uN}$ for converting the band-limited image signals should preferably be defined independently such that a processed image signal Sproc having desired frequency characteristics may be obtained.

By way of example, the functions shown in FIG. 14 carry out the conversion such that a band-limited image signal having a large amplitude may be restricted, and such that the degree of restriction of a band-limited image signal of a high frequency band may be higher than the degree of restriction of a band-limited image signal of a low frequency band. Such conversion is carried out by considering that the high frequency components contained in an edge in an actual radiation image have a smaller amplitude than the amplitude of low frequency components. Specifically, in an actual radiation image, even at a very sharp edge in the radiation image, the signal does not take a definite step-like profile, but the amplitude of the high frequency components becomes smaller than the amplitude of the low frequency components. Therefore, in accordance with the amplitude of the respective frequency components, as for a band-limited image signal having a high frequency, the restriction should preferably be carried out starting with a small amplitude. The functions shown in FIG. 14 can achieve such restriction.

Each of the functions illustrated in FIG. 15 converts the band-limited image signal such that the absolute value of the band-limited image signal may be converted to a value, which is not larger than the absolute value of the band-limited image signal and is determined in accordance with the absolute value of the band-limited image signal. In a function for processing a low frequency band, the absolute value of the converted image signal, that is obtained when the band-limited image signal having a signal value, the absolute value of which falls within a predetermined range close to 0, is converted, takes a value smaller than those in the other functions. In other words, the functions have the characteristics such that each function may pass through the origin, and such that the inclination of the function may be equal to at most 1 regardless of the value of the band-limited image signal processed with the function. The functions also have the characteristics such that, in a function for processing a low frequency band, the inclination of the function in the region, in which the absolute value of the band-limited image signal is close to 0, may be smaller than those in the other functions. These functions have the effects described below. Specifically, when the integration signal, which has been obtained by integrating the converted image signals, is added to the original image signal Sorg, the joint between the original image signal Sorg and the integration signal can be formed in a natural pattern. More specifically, the rise of the signal can be rendered natural.

Figure 16:
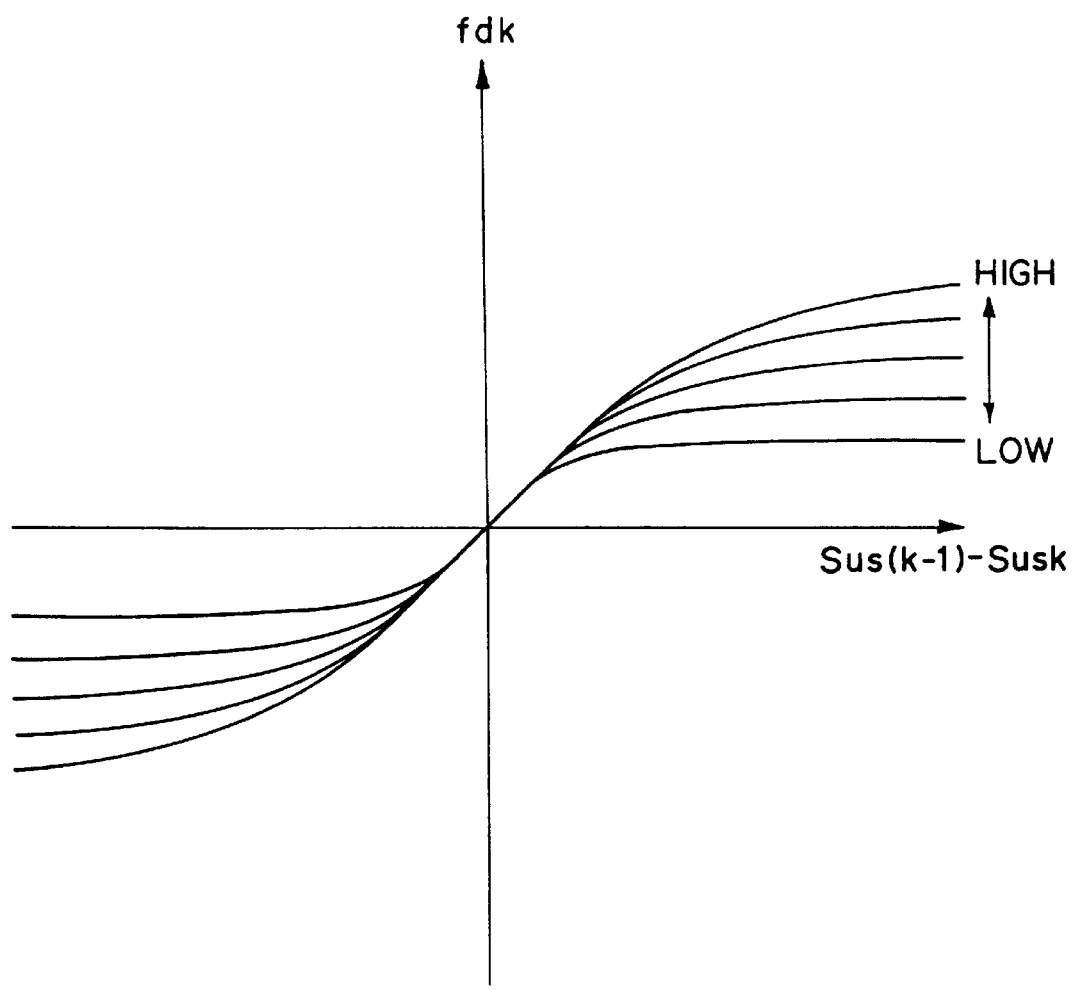
FIG. 16 is a graph showing examples of functions, which are used in a converting process carried out on band-limited image signals in a second conversion means.

The conversion with the converters 22b, 22b, . . . of the second conversion means 3b is carried out by using, for example, functions shown in FIG. 16, the functions shown in FIG. 15, or a combination of the functions shown in FIG. 16 and the functions shown in FIG. 15. As in the conversion with the first conversion means 3a, functions $f_{d1}$ to $f_{dN}$ for converting the band-limited image signals may be identical with one another. However, each of the functions $f_{d1}$ to $f_{dN}$ for converting the band-limited image signals should preferably be defined independently such that a processed image signal Sproc having desired frequency characteristics may be obtained.

The converted image signals, which have been obtained from the first conversion means 3a, are fed into an operation device 23a. Also, the converted image signals, which have been obtained from the second conversion means 3b, are fed into an operation device 23b. The operation device 23a carries out operations for forming a signal, which is necessary for frequency emphasis processing. The operation device 23b carries out operations for forming a signal, which is necessary for dynamic range compression processing.

The operation device 23a is provided with the aforesaid first integration means 4a and the afore(said frequency emphasis processing means 5. In the operation device 23a, the processing described below is carried out. Firstly, as described above, the converted image signals, which have been formed by the first conversion means 3a, are integrated, and the integration signal is thereby formed. Thereafter, in the frequency emphasis processing means 5, and the integration signal, which has been obtained from the first integration means 4a, is multiplied by an emphasis coefficient β, which takes a value in accordance with the value of the original image signal Sorg.

The operation device 23b is provided with the aforesaid second integration means 4b, the aforesaid subtraction means 6, and the aforesaid dynamic range compression processing means 7. In the operation device 23b, the processing described below is carried out. Firstly, as described above, the converted image signals, which have been formed by the second conversion means 3b, are integrated, and the integration signal is thereby formed. The thus obtained integration signal is subtracted from the original image signal Sorg, and the difference signal is thereby obtained. The difference signal is then converted with a predetermined function, and a dynamic range compression factor is thereby calculated.

The signals, which have been obtained from the operation devices 23a and 23b, are fed into the addition means 8 and added to the original image signal Sorg. In this manner, a processed image signal Sproc is obtained.

The processing described above may be represented by Formula (4) shown below.

$$Sproc = Sorg + \beta(Sorg) \cdot Fusm(Sorg, Sus1, Sus2, \ldots, SusN) + D(Sorg - Fdrc(Sorg, Sus1, Sus2, \ldots, SusN)) \quad (4)$$

$$Fusm(Sorg, Sus1, Sus2, \ldots, SusN) = \{f_{u1}(Sorg - Sus1) + f_{u2}(Sus1 - Sus2) + \ldots + f_{uk}(Susk - 1 - Susk) + \ldots + f_{uN}(SusN - 1 - SusN)\}$$

$$Fdrc(Sorg, Sus1, Sus2, \ldots, SusN) = \{f_{d1}(Sorg - Sus1) + f_{d2}(Sus1 - Sus2) + \ldots + f_{dk}(Susk - 1 - Susk) + \ldots + f_{dN}(SusN - 1 - SusN)\}$$

wherein Sproc represents the processed image signal, Sorg represents the original image signal, Susk (k=1 to N) represents the unsharp mask image signal, $f_{uk}$ (k=1 to N) represents the function used in the first converting process, $f_{dk}$ (k=1 to N) represents the function used in the second converting process, β(Sorg) represents the emphasis coefficient determined in accordance with the original image signal, and D (Sorg–Fdrc) represents the dynamic range compression factor determined in accordance with the low frequency component signal, in which D represents the function for converting Sorg–Fdrc.

Specifically, with the image processing method and apparatus in accordance with the present invention, the plurality of the band-limited image signals, each of which represents one of signals falling within a plurality of different frequency bands of the original image signal, are formed from the original image signal, and the converting process is carried out with respect to each of the frequency bands. Therefore, the occurrence of an artifact, such as overshoot, undershoot, or an artificial contour, at an image edge portion can be restricted. In particular, in cases where each of the functions for converting the band-limited image signals is defined independently, a processed image having better image quality can be obtained.

In the embodiment described above, the signal to be used in the frequency emphasis processing and the signal to be used in the dynamic range compression processing are formed from the original image signal Sorg, and the addition of the two signals to the original image signal Sorg is then carried out. Alternatively, either one of the frequency emphasis processing and the dynamic range compression processing may firstly be carried out on the original image signal Sorg, and thereafter the other processing may be carried out on the thus obtained signal.

Ordinarily, an image portion having a low image density in a radiation image is the one which has been recorded with a low dose of radiation. Therefore, the image portion having a low image density contains much noisy. In the frequency emphasis processing, image density-dependent emphasis processing is carried out such that the degree of emphasis may be high with respect to an image portion having a high image density. Accordingly, in cases where the frequency emphasis processing is carried out directly upon the original image signal, the image portion having a low image density is not emphasized, and noise is not emphasized.

On the other hand, for example, if the dynamic range compression processing is firstly carried out on the original image signal, and thereafter the frequency emphasis processing is carried out, the image density of the image portion having a low image density will become high due to the dynamic range compression processing. In such cases, the image portion, which originally had a low image density, will be emphasized by the emphasis processing, and therefore noise contained in the image portion will also be emphasized.

Accordingly, as in the aforesaid embodiment, the signal to be used in the frequency emphasis processing and the signal to be used in the dynamic range compression processing should preferably be formed from the original image signal. Also, the frequency emphasis processing and the dynamic range compression processing should preferably be carried out in parallel.

What is claimed is:

1. An image processing method, wherein a signal concerning high frequency components of an original image signal, which represents an original image, is added to the original image signal, the high frequency components of the original image signal being thereby emphasized, and wherein a signal concerning low frequency components of the original image signal is added to the original image signal, the dynamic range of the original image signal being thereby compressed, the method comprising the steps of:

i) forming a plurality of unsharp mask image signals, which have different frequency response characteristics, from the original image signal, ii) forming a plurality of band-limited image signals, each of which represents one of signals falling within a plurality of different frequency bands of the original image signal, from the original image signal and the plurality of said unsharp mask image signals, or from the plurality of said unsharp mask image signals, iii) obtaining the signal concerning the high frequency components of the original image signal by:

carrying out a first converting process on at least one band-limited image signal, which is among the plurality of said band-limited image signals, such that at least a portion of the band-limited image signal becomes small, a plurality of first converted image signals being thereby formed, and integrating the plurality of said first converted image signals, iv) obtaining the signal concerning the low frequency components of the original image signal by:

carrying out a second converting process on at least one band-limited image signal, which is among the plurality of said band-limited image signals, such that at least a portion of the band-limited image signal becomes small, a plurality of second converted image signals being thereby formed, integrating the plurality of said second converted image signals, an integration signal being thereby formed, subtracting said integration signal from the original image signal, a difference signal being thereby formed, and converting said difference signal, and v) adding the signal concerning the high frequency components and the signal concerning the low frequency components to the original image signal, thereby the high frequency components of the original image signal are emphasized and the dynamic range of the original image signal is compressed.

2. A method as defined in claim 1 wherein the formation of said band-limited image signals, the formation of said first converted image signals, the formation of said second converted image signals, the formation of the signal concerning the high frequency components, the formation of the signal concerning the low frequency components, and the addition of the signal concerning the high frequency components and the signal concerning the low frequency components to the original image signal are carried out with the formula:

$$Sproc = Sorg + \beta(Sorg) \cdot Fusm(Sorg, Sus1, Sus2, \ldots, SusN) + D(Sorg - Fdrc(Sorg, Sus1, Sus2, \ldots, SusN))$$

$$Fusm(Sorg, Sus1, Sus2, \ldots, SusN) = \{f_{u1}(Sorg - Sus1) + f_{u2}(Sus1 - Sus2) + \ldots + f_{uk}(Susk-1 - Susk) + \ldots + f_{uN}(SusN-1 - SusN)\}$$

$$Fdrc(Sorg, Sus1, Sus2, \ldots, SusN) = \{f_{d1}(Sorg - Sus1) + f_{d2}(Sus1 - Sus2) + \ldots + f_{dk}(Susk-1 - Susk) + \ldots + f_{dN}(SusN-1 - SusN)\}$$

wherein Sproc represents the processed image signal, Sorg represents the original image signal, Susk (k=1 to N) represents the unsharp mask image signal, $f_{uk}$ (k=1 to N) represents the function used in the first converting process, $f_{dk}$ (k=1 to N) represents the function used in the second converting process, $\beta(Sorg)$ represents the emphasis coefficient determined in accordance with the original image signal, and D (Sorg–Fdrc) represents the dynamic range compression factor determined in accordance with the low frequency component signal, in which D represents the function for converting Sorg–Fdrc.

3. An image processing apparatus, wherein a signal concerning high frequency components of an original image signal, which represents an original image, is added to the original image signal, the high frequency components of the original image signal being thereby emphasized, and wherein a signal concerning low frequency components of the original image signal is added to the original image signal, the dynamic range of the original image signal being thereby compressed, the apparatus comprising:

i) an unsharp mask image signal forming means for forming a plurality of unsharp mask image signals, which have different frequency response characteristics, from the original image signal, ii) a band-limited image signal forming means for forming a plurality of band-limited image signals, each of which represents one of signals falling within a plurality of different frequency bands of the original image signal, from the original image signal and the plurality of said unsharp mask image signals, or from the plurality of said unsharp mask image signals, iii) a first conversion means for carrying out a first converting process on at least one band-limited image signal, which is among the plurality of said band-limited image signals, such that at least a portion of the band-limited image signal becomes small, and thereby forming a plurality of first converted image signals, iv) a first integration means for integrating the plurality of said first converted image signals, which have been formed by said first conversion means, and thereby forming a first integration signal, v) a frequency emphasis processing means for obtaining the signal concerning the high frequency components of the original image signal in accordance with said first integration signal, vi) a second conversion means for carrying out a second converting process on at least one band-limited image signal, which is among the plurality of said band-limited image signals, such that at least a portion of the band-limited image signal becomes small, and thereby forming a plurality of second converted image signals, vii) a second integration means for integrating the plurality of said second converted image signals, which have been formed by said second conversion means, and thereby forming a second integration signal, viii) a subtraction means for subtracting said second integration signal from the original image signal, and thereby forming a difference signal, ix) a dynamic range compression processing means for converting said difference signal and thereby obtaining the signal concerning the low frequency components of the original image signal, and x) an addition means for adding the signal concerning the high frequency components and the signal concerning the low frequency components to the original image signal, whereby the high frequency components of the original image signal are emphasized and the dynamic range of the original image signal is compressed.

4. An apparatus as defined in claim 3 wherein the formation of said band-limited image signals, the formation of said first converted image signals, the formation of said second converted image signals, the formation of the signal concerning the high frequency components, the formation of the signal concerning the low frequency components, and the addition of the signal concerning the high frequency components and the signal concerning the low frequency components to the original image signal are carried out with the formula:

$$Sproc = Sorg + \beta(Sorg) \cdot Fusm(Sorg, Sus1, Sus2, \ldots, SusN) + D(Sorg - Fdrc(Sorg, Sus1, Sus2, \ldots, SusN))$$

$$Fusm(Sorg, Sus1, Sus2, \ldots, SusN) = \{f_{u1}(Sorg - Sus1) + f_{u2}(Sus1 - Sus2) + \ldots + f_{uk}(Susk-1 - Susk) + \ldots + f_{uN}(SusN-1 - SusN)\}$$

$$Fdrc(Sorg, Sus1, Sus2, \ldots, SusN) = \{f_{d1}(Sorg - Sus1) + f_{d2}(Sus1 - Sus2) + \ldots + f_{dk}(Susk-1 - Susk) + \ldots + f_{dN}(SusN-1 - SusN)\}$$

wherein Sproc represents the processed image signal, Sorg represents the original image signal, Susk (k=1 to N) represents the unsharp mask image signal, $f_{uk}$ (k=1 to N) represents the function used in the first converting process, $f_{dk}$ (k=1 to N) represents the function used in the second converting process, $\beta(Sorg)$ represents the emphasis coefficient determined in accordance with the original image signal, and D(Sorg–Fdrc) represents the dynamic range compression factor determined in accordance with the low frequency component signal, in which D represents the function for converting Sorg–Fdrc.

* * * * *